United States Patent [19]

Vinokur

[11] Patent Number: 4,787,122
[45] Date of Patent: Nov. 29, 1988

[54] ROTATABLE SAUSAGE FORMING SLEEVE MEMBER FOR THE INLET OF A SAUSAGES PRODUCING APPARATUS

[75] Inventor: Isaac Vinokur, Buenos Aires, Argentina

[73] Assignee: Envaril, S.A., Buenos Aires, Argentina

[21] Appl. No.: 64,885

[22] Filed: Jun. 22, 1987

[30] Foreign Application Priority Data

Sep. 17, 1986 [AR] Argentina .................. 305.292

[51] Int. Cl.⁴ .............................................. A22C 11/02
[52] U.S. Cl. ............................................ 17/35; 17/41
[58] Field of Search ............................ 17/33, 34, 41, 42

[56] References Cited

U.S. PATENT DOCUMENTS 4,570,300 2/1986 Nausedas ..................... 17/33 X
4,670,942 6/1987 Townsend ..................... 17/33

Primary Examiner—Willie G. Abercrombie
Attorney, Agent, or Firm—Lackenbach Siegel Marzullo & Aronson

[57] ABSTRACT

In an apparatus for producing sausages comprising a source of meat mass connected to a tubular injector of such a meat mass and which ends in a rotatable sausage forming sleeve member capable of rotating altogether with a tubular casing which is arranged about the tubular injector and passed through the sleeve member, and a pulling and constricting assembly which pulls out the tubular casing already filled with the meat mass from the sleeve member, the sleeve member including a longitudinal passage axially passing therethrough and which defines a converging inlet wherein a plurality of radially inwardly extending projections are arranged, said inlet leading to an inside surface wherein a plurality of rolling means are provided, both the projections and the rolling means are able to rotate and lead the tubular casing filled with meat mass through the sleeve member without excessive frictional engagement.

4 Claims, 1 Drawing Sheet

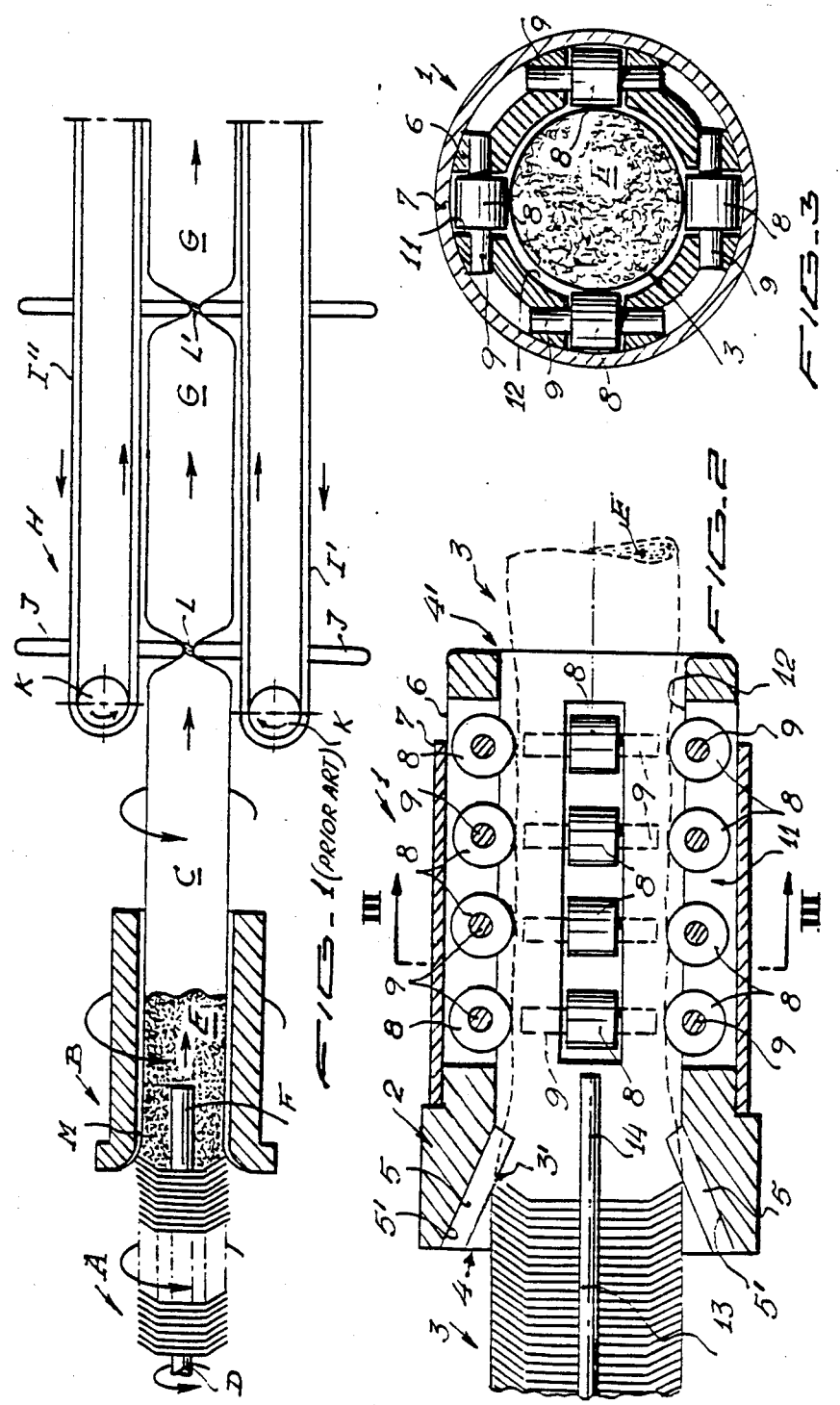

ROTATABLE SAUSAGE FORMING SLEEVE MEMBER FOR THE INLET OF A SAUSAGES PRODUCING APPARATUS

FIELD OF THE INVENTION

The present invention relates to a rotatable sleeve for feeding sausages producing apparatus and more particularly for manufacturing strings of sausages consisting of a meat pulp or mass housed in a thin film casing. The resulting product may be further subject to a cooking step and thereafter the casing may be removed to achieve skinless sausages.

A sausage manufacturing apparatus including the sleeve member of the present invention is able to produce in a continuous process long strings of sausages without tearing the film casing.

DESCRIPTION OF THE PRIOR ART

As is well known to those skilled in the art, sausages in general, as well as those sausages known as skinless sausages, are produced by injecting a flowable, hashed meat mass into a tubular film casing closed at one end. The meat mass is supplied by a general tubular injector projecting into a tubular film which has been previously axially stored on this tubular injector. To enable the injector to store a long tubular film casing on a rather short tubular injector, a 30 m long tubular casing is first accordion-like plied along its longitudinal axis, in order to form a short and rectilineal "corrugated cartridge" of 30 cm length, which is then axially stored on said tubular injector. The beginning of a cartridge is thread through the sausage manufacturing machine, downstream the tubular injector and then closed. Thereafter the hashed meat mass is injected into the film casing. After the 30 m casing having been transformed into a long string of sausages, a new cartridge is arranged onto the tubular injector. The tubular injector projects into a sausage forming sleeve member which is arranged at the inlet end of the sausages manufacturing machine. As the hashed meat mass is being injected, the tubular film casing unplies from the cartridge and passes through the sleeve member. The meat filled tubular film is pulled out from an outlet end of the sleeve by means of a pulling and constricting assembly arranged downstream of said outlet end, and which actually forms the string of sausages.

The conventional sleeve member applied to sausage manufacturing machines, has its inside surface provided with a plurality of parallel longitudinal grooves extending along the entire length of the sleeve. The meat filled tubular casing enters the sleeve and penetrates into the grooves thereof. The sleeve is rotated. The pulling and constricting assembly is thus able to form a plurality of spaced apart twisted knot portions as the meat filled tubular casing progresses therethrough to thus form the string of sausages, as is well known by those skilled in the art.

Practice has shown that in these known sleeve members two drawbacks exist. The tubular film should exert a sufficient pressure against the inside surface of the tubular sleeve to become rotated by the latter, but this pressure should not be so large as to produce a blocking or wedging effect by the grooves on the tubular film, because that would stop the tubular film from being able to slide along the sleeve member. However the magnitude of the pressure must be sufficient to achieve a "meshing" contact between the tubular film and the grooves of the sleeve member, to assure that the rotation of the sleeve member is transmitted to the meat filled tubular casing.

When the pressure between the film or casing and the sleeve member is excessive, the tubular film tears due to the tension exerted by the pulling and constricting assembly. If this happens the machine must be stopped and cleaned. This is expensive, time consuming, and meat is wasted.

In case the pressure between the tubular film and the sleeve member is insufficient, the casing will not be rotated and the sausages will not be formed.

Another problem which arises with the use of known sleeve members is that generally the tubular film casings used for a particular type of sausage strings to be produced have not always the same diameter, and therefore the friction between the sleeve member and the tubular casings varies from casing to casing and again, in some cases the frictional coefficient increases so much, that the tubular casing is torn.

BACKGROUND OF THE INVENTION

It is an object of the present invention to provide a rotatable sausage forming sleeve member, which is to be arranged at the inlet end of a sausage producing machine, and capable of assuring a continuous sliding and rotation of the tubular film, already filled with the meat mass, without tearing the tubular film, in order to attain a correct and continuous formation of a string of sausages.

The rotatable sleeve member of the present invention includes a plurality of short longitudinal grooves formed only at the convergent inlet end on the inside surface of the sleeve. This structure enables attaining a meshing effect between the tubular casing and the inlet end of the sleeve to cause the casing to rotate altogether with the sleeve member and at the same angular speed thereof. In order to avoid wedging and tearing, of the tubular film, the length of such meshing is short and additional means are provided to reduce the frictional engagement between the remaining portions of the sleeve member up to its outlet and said tubular casing.

SUMMARY OF THE INVENTION

The present invention provides a rotatable sausage forming sleeve member for use in a sausage manufacturing apparatus, and particularly to be interposed between a meat mass injector and a known pulling and constricting assembly, capable of taking the already meat filled tubular film casing which in being rotated, and producing a twisting effect on spaced apart portions of the casing to generate twisted knot portions intermediate the sausages portions.

The structure of the sleeve of the present invention is such, that it is able to successively compensate variations in cartridge-diameters and therefore overcomes the problems of tearing casings due to excessive friction. Diameter variations may also be generated by pressure variations upon injecting the meat mass into the casings. One should bear in mind that the casings are somewhat resilient.

The sleeve member of the present invention is capable of suitably rotating the casing due to its particular longitudinal grooves located at the converging inlet end. In order to assure a good sliding of the casing filled with meat mass, within the sleeve member, the latter includes a plurality of rotating means downstream of said inlet end, and projecting into the passage defined by said sleeve member. These rotating means slidably support the casing in spaced apart relationship to the inside wall of said sleeve member and thus further avoiding a blocking or wedging effect.

In short, the present invention relates to a sausage producing apparatus using a tubular casing, a rotatable sleeve member having an inlet and an outlet, a source of flowable meat mass, a tubular injector connected to said source and having a nozzle housed within said inlet, for injecting said flowable meat mass into said tubular casing which is to be rotated by the sleeve member defining a longitudinal axis, and a pulling and constricting assembly for pulling the meat filled casing through the sleeve member and constricting at short intervals the meat mass filled casing to form a string of sausages, the improvement wherein said inlet is a converging inlet portion including a plurality of longitudinal grooves therebetween, a through passage in said sleeve extending between said inlet portion and said outlet and including a plurality of freely rotatable rolling means providing peripheral surfaces for moving the tubular casing there along, with a minimum frictional engagement and in the direction of said longitudinal axis, to enable the tubular casing to freely slide out of said outlet of said sleeve member.

For a better understanding of the present invention, reference will now be made, by way of example, to the attached sheet of drawings, in which a preferred embodiment of the invention is disclosed, and which facilitates the comprehension of the principle of the invention.

BRIEF DESCRIPTION OF THE DRAWINGS

FIG. 1 is a side elevation, partially in longitudinal section, of part of a conventional apparatus for producing sausages, wherein a conventional rotatable sleeve member is shown.

FIG. 2 is a longitudinal sectional view of the rotating sleeve member according to the present invention, and FIG. 3 is a cross-section along lines III—III of FIG. 2.

DESCRIPTION OF THE PRIOR ART

Referring first to FIG. 1, a conventional sausage forming apparatus is shown consisting of a tubular injector D having a nozzle F which projects into the inlet of a sleeve member B. A cartridge A consisting of an accordion type plied tubular film casing, is stored onto the tubular injector D. The outlet end of the sleeve member B faces the inlet end of a pulling and constricting assembly H which will transform a rotating hashed meat filled tubular casing into a string of sausages, as is already known by those skilled in the art. This constricting assembly H consists of two opposite endless belts I' and I", which have a plurality of equally spaced apart jaw members J which, upon rotating of the belts I', I", successively face pairwise.

The front end of the accordion plied tubular casing A is withdrawn from the tubular injector D passed along the nozzle F, through the sleeve B and the pulling and constricting assembly H to be then closed at the forward end emerging out of said assembly H. Upon injecting hashed meat E into the tubular casing a filled tubular portion C is generated and upon simultaneously rotating said sleeve B and driving said belts I' and I", the first clamped portion L of said tubular casing is blocked from rotation and thereby twisted, producing a knot. As the process progressively continues, successive spaced apart knots are formed and thereby a string of sausages G is produced. The endless belts I', I" are driven by corresponding wheels K.

The tubular film casing and the partially formed sausage C is rotated around its longitudinal axis due to the meshing contact between the tubular film and the longitudinal grooves M in the sleeve member B. These longitudinal grooves M extend along the entire length of the sleeve member B and this is the arrangement which causes the undesired tearing previously referred to.

DESCRIPTION OF THE PREFERRED EMBODIMENT

Referring now to FIG. 2, the sleeve member of the present invention is identified by reference numeral 1 and comprises a rear portion 2 forming the inlet end 4 of the sleeve member and whereinto the front end of a cartridge 3, is inserted. The inlet end 4 of the sleeve 1, has a plurality of converging projections 5, extending radially inwardly towards the longitudinal axis 14 of the sleeve 1. Thus grooves 5' are formed between adjacent projections 5. Depending on the cross-sectional size of the cartridge, the later will always be able to enter at some intermediate portion of said projections 5 in contact therewith, upon being filled with hashed meat. In the example shown, the end of the cartridge 3 enters in contact at 3' and there the tubular film forming the cartridge 3 is unfolded and introduced into the grooves 5' between the projections 5 obtaining thus a meshing engagement. As known, the sleeve member 1 is rotated, which result in the rotation of the film casing. In order to rotate the sleeve member 1, a pulley portion 7 for a driving belt (not shown) is rigidly mounted on the cylindrical body portion 6 of the sleeve member 1.

The sleeve member 1 according to the present invention further includes a plurality of rolling means located on the inner periphery defining a through passage 12. Said rolling means are rollers 8 which are capable of freely rotating about their own shafts 9 which are endwise supported by body 6, as clearly shown in FIG. 3. With reference to FIG. 2, rollers 8 form longitudinal groups, each one partially located in a corresponding longitudinal groove 11 formed in the cylindrical body 6 of the sleeve member 1 and which grooves 11 face the longitudinal through passage 12 which extends up to the outlet end 4'. FIG. 3 shows that pairs of grooves 11 are diametrically opposite. In practice this pairwise arrangement may be changed and other possible arrangements and number of grooves may be used.

A tubular injector 13 for ejecting a meat mass E within the tubular film 3 is located coaxially with the longitudinal axis 14 at the inlet end 4 of the sleeve 1 and its nozzle penetrates into the passage 12.

As to the operation of the sleeve member 1, once the free end cartridge 3 is abutting the projections 5 of the inlet end 4 of the sleeve member 1, said free end is hand threaded through the machine (see FIG. 1). More particularly, the free end is unfolded and the resulting tubular film is passed through passage 12 of the sleeve member 1 prior to retaining it between the jaw member J of the pulling and constricting assembly H. Then the meat mass E is ejected through the tubular injector 13 into the tubular casing and the latter, already filled with the meat mass E, is continuously pulled forward by the assembly H.

At the inlet end 4 of the sleeve member 1, and due to the presence of the meat mass E within the tubular casing at this zone, the filled tubular casing will mesh the projections 5 of the sleeve member, and this meshing engagement will be sufficient to rotate the cartridge and tubular film 3. However the frictional engagement is sufficiently low to enable the assembly to move the film 3 forward without tearing it. The unfolded tubular film already filled with meat mass will move along the through passage 12 by sliding along the rollers 8 which freely rotate due to the contact with the tubular casing. Thus a movement of the tubular film with an extremely low friction is generated and therefore no tearing of the tubular casing takes place.

It will thus be understood that the sleeve of the present invention provides at the inlet a sufficient frictional contact between the tubular casing and the sleeve member, to rotate the tubular casing and only generates a low frictional contact between the tubular casing and the passage 12 of sleeve member in order that the former be pulled out of the sleeve member without bearing, whereby a fast production of a string of sausages is achieved.

FIG. 3, shows how the tubular casing 3 is in contact with four groups of rollers 8, forming a cross configuration. If the tubular casing expands somewhat further, but without entering in contact with the inner wall portion of the passagae 12, it will increase the contact surface with the rollers 8, thereby providing an increased meshing, without increasing the tendency of tearing of the casing.

Although the essential features of the invention have been brought out by means of a preferred embodiment, the invention is not limited to this embodiment and extends on the contrary to all alternative forms within the purview of the appended claims.

I claim:

1. In a sausage producing apparatus using a tubular casing, a rotatable sleeve member having an inlet and an outlet, a source of flowable meat mass, a tubular injector connected to said source and having a nozzle housed within said inlet, for injecting said flowable meat mass into said tubular casing which is to be rotated by the sleeve injector defining a longitudinal axis, and a pulling and constricting assembly for pulling the meat filled casing through the sleeve member and constricting at short intervals the meat mass filled casing to form a string of sausages, the improvement wherein said inlet is a converging inlet portion including a plurality of longitudinal radially extending projections forming longitudinal grooves therebetween, a through passage in said sleeve extending between said inlet portion and said outlet and including a plurality of freely rotatable rolling means providing peripheral surfaces for moving the tubular casing there along, with a minimum frictional engagement and in the direction of said longitudinal axis, to enable the tubular casing to freely slide out of said outlet of said sleeve member.

2. The apparatus of claim 1, wherein said rolling means comprises rollers rotatably mounted and projecting into said through passage of said sleeve member.

3. The apparatus of claim 2, wherein pairs of said rollers face each other and are diametrically spaced apart by a distance smaller than the diameter of said through passsage.

4. The apparatus of claim 3, wherein the rollers form linearly arranged groups and each group of rollers is partially housed in a longitudinal groove formed in the through passage.

* * * * *